US008411695B1

(12) United States Patent
Chengson et al.

(10) Patent No.: US 8,411,695 B1
(45) Date of Patent: Apr. 2, 2013

(54) MULTI-INTERFACE COMPATIBLE BUS OVER A COMMON PHYSICAL CONNECTION

(75) Inventors: David P. Chengson, Scotts Valley, CA (US); Jaya Bandyopadhyay, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 817 days.

(21) Appl. No.: 11/134,256

(22) Filed: May 23, 2005

(51) Int. Cl.
*H04L 12/28* (2006.01)
(52) U.S. Cl. .................................................. 370/419
(58) Field of Classification Search .................... 370/419
See application file for complete search history.

(56) References Cited

U.S. PATENT DOCUMENTS

| | | | | |
|---|---|---|---|---|
| 4,379,327 A * | 4/1983 | Tietjen et al. | .................... | 710/61 |
| 4,593,282 A * | 6/1986 | Acampora et al. | ............ | 370/447 |
| 4,615,017 A * | 9/1986 | Finlay et al. | .................. | 713/400 |
| 5,339,395 A * | 8/1994 | Pickett et al. | .................. | 710/305 |
| 5,355,090 A * | 10/1994 | Pajowski et al. | .............. | 327/292 |
| 5,377,189 A * | 12/1994 | Clark | ........................... | 370/462 |
| 5,434,996 A * | 7/1995 | Bell | ............................... | 713/400 |
| 5,590,369 A * | 12/1996 | Burgess et al. | ............... | 710/110 |
| 5,594,874 A * | 1/1997 | Narayanan et al. | ........... | 710/104 |
| 6,327,175 B1* | 12/2001 | Manapat et al. | ............... | 365/154 |
| 6,516,422 B1* | 2/2003 | Doblar et al. | .................. | 713/503 |
| 6,621,828 B1* | 9/2003 | Field et al. | ..................... | 370/466 |
| 6,725,390 B1* | 4/2004 | Liu et al. | ........................ | 713/401 |
| 6,795,882 B1* | 9/2004 | Kommrusch | .................. | 710/100 |
| 6,854,069 B2* | 2/2005 | Kampe et al. | ................. | 714/4.12 |
| 6,925,516 B2* | 8/2005 | Struhsaker et al. | ........... | 710/301 |
| 7,372,875 B2* | 5/2008 | Hadzic et al. | .................. | 370/516 |
| 2002/0131257 A1* | 9/2002 | Agard | ........................... | 361/796 |
| 2003/0135675 A1* | 7/2003 | Pontius et al. | ................. | 710/107 |
| 2005/0216609 A1* | 9/2005 | Singla et al. | ..................... | 710/22 |
| 2008/0162765 A1* | 7/2008 | Yamamoto et al. | ........... | 710/302 |

OTHER PUBLICATIONS

WO 92/02990, International Application, Synchronous/Asynchronous Data bus with message priority handling capability and segmented memory transfer, Welsh.*

* cited by examiner

*Primary Examiner* — John Blanton
(74) *Attorney, Agent, or Firm* — Harrity & Harrity, LLP

(57) ABSTRACT

A multi-interface bus allows for different bus standards to be implemented over the same set of physical bus lines. More particularly, in one implementation, the system includes a first circuit board, a second circuit board, and a bus connecting the first and second circuit boards. The second circuit board is configured to communicate with the first circuit board using either a synchronous or an asynchronous bus protocol determined based on a bus protocol used by the first circuit board.

21 Claims, 7 Drawing Sheets

MULTI-INTERFACE COMPATIBLE BUS OVER A COMMON PHYSICAL CONNECTION

BACKGROUND OF THE INVENTION

A. Field of the Invention

The present invention relates generally to data transfer and, more particularly, to interfaces that enable multiple types of buses over a common physical connection.

B. Description of Related Art

A communications bus can be used to couple electrical components in a network device. One attribute of bus operation is signal timing. In a source synchronous bus, for instance, the bus is driven by a common clock and all signals are sampled based on the common clock. The common clock may be provided by the transmitting component and transmitted with the data. An asynchronous bus does not provide a common timing clock. For an asynchronous bus, the receiving device may generate a clock signal, based on the received data signal, that is then used to sample the data signal.

It can be desirable to include multiple different bus techniques in a single system. For example, a system, such as a router, may include many different interchangeable circuit boards, some of which are designed to communicate with other circuit boards using a source synchronous bus and others of which were designed to communicate via an asynchronous bus. It would be desirable to allow the source synchronous circuit boards and the asynchronous circuit boards to share a common set of bus connection paths. Such a multi-interface bus can be difficult to implement, particularly in high bandwidth applications. In such applications, using quick switches (e.g., FET transistors) and multiplexers to switch between buses can introduce undesirable effects, such as signal skew.

Accordingly, it would be desirable to implement an effective multi-interface high speed bus.

SUMMARY OF THE INVENTION

One aspect consistent with principles of the invention is directed to a system that includes a first circuit board, a second circuit board, and a bus connecting the first and second circuit boards. The second circuit board communicates with the first circuit board using either a synchronous or an asynchronous bus protocol determined based on a bus protocol used by the first circuit board.

Another aspect consistent with principles of the invention is directed to a network device including a system, a first card inserted into the midplane, and a second card. The second card is capable of communicating with the first card asynchronously or synchronously through a bus formed by a group of communication lines. The second card selects asynchronous or synchronous communications depending on a type of the first card inserted into the system.

Yet another aspect consistent with principles of the invention is directed to a network card for connecting to an external bus. The network card includes a multiplexer configured to select between first and second clock signals based on a type of external circuit board attached to the external bus. The network card further includes logic to receive data over the bus by using the first clock signal to recover a first sampling clock signal from a data signal of the bus when the external circuit board uses a synchronous bus and using the second clock signal to recover a second sampling clock signal from a data signal of the bus when the external circuit board uses an asynchronous bus.

Yet another aspect consistent with principles of the invention is directed to a method implemented in a network device. The method includes detecting types of networking cards inserted into a system. The method further includes configuring one or more buses based on the detected types of networking cards, the configuring including setting a first one of the networking cards to communicate synchronously when a second one of the networking cards is detected as being a networking card designed to communicate synchronously and setting the first one of the networking cards to communicate asynchronously when a third one of the networking cards is detected as being a networking card designed to communicate asynchronously.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the principles of the invention refers to the accompanying drawings. The same reference numbers in different drawings may identify the same or similar elements. Also, the following detailed description does not limit the invention. Instead, the scope of the invention is defined by the appended claims and equivalents.

A multi-interface high-speed bus is described herein that can accommodate either source synchronous or clock-recovered asynchronous operation. In addition to being source synchronous or asynchronous, the different buses may include different clock frequencies, different signal levels, different pin counts, and different bit-to-bit skew properties.

Figure 1:
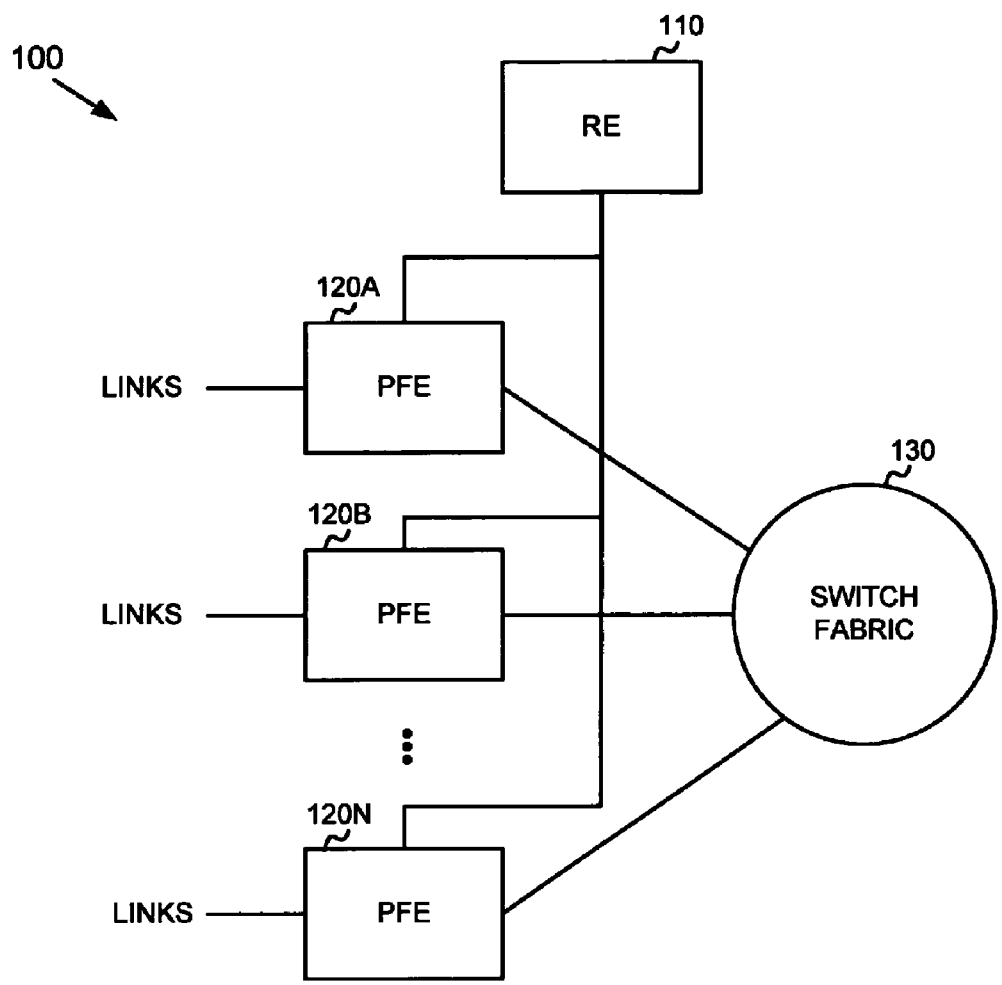
FIG. 1 is a diagram of an exemplary system in which concepts consistent with the principles of the invention may be implemented.

FIG. 1 is a diagram of an exemplary system 100 in which concepts consistent with the principles of the invention may be implemented. In this particular implementation the system takes the form of a router, although the principles of the invention may be applied in any type of system or device.

System 100 receives one or more packet streams (or streams of data in other formats) from physical links, processes the packet stream(s) to determine destination information, and transmits the packet stream(s) out on links in accordance with the destination information. System 100 may include a routing engine (RE) 110, packet forwarding engines (PFEs) 120A, 120B, . . . , 120N (referred to collectively as "PFEs 120"), and a switch fabric 130.

RE 110 performs high level management functions for system 100. For example, RE 110 may maintain the connectivity and manages information and data necessary for performing routing by system 100. RE 110 may create routing tables based on network topology information, create forwarding tables based on the routing tables, and communicate the forwarding tables to PFEs 120. PFEs 120 may use the forwarding tables to perform route lookup for incoming packets and perform the forwarding functions for system 100. RE 110 may also perform other general control and monitoring functions for system 100.

PFEs 120 are each connected to RE 110 and switch fabric 130. PFEs 120 receive packet data on physical links connected to a network, such as a wide area network (WAN) or a local area network (LAN). Each physical link could be one of many types of transport media, such as optical fiber or Ethernet cable.

PFEs 120 may process incoming packet data prior to transmitting the data to another PFE or the network. PFEs 120 may also perform route lookup for the data using the forwarding table from RE 110 to determine destination information. If the destination indicates that the data should be sent out on a physical link connected to one of PFEs 120, then the PFE prepares the data for transmission by, for example, adding any necessary headers, and transmits the data from the port associated with the physical link. If the destination indicates that the data should be sent to another PFE via switch fabric 130, then PFE 120 prepares the data for transmission to the other PFE, if necessary, and sends the data to the other PFE via switch fabric 130. Switch fabric 130 may generally include hardware and software used to communicate data between PFEs of the router.

Figure 2:
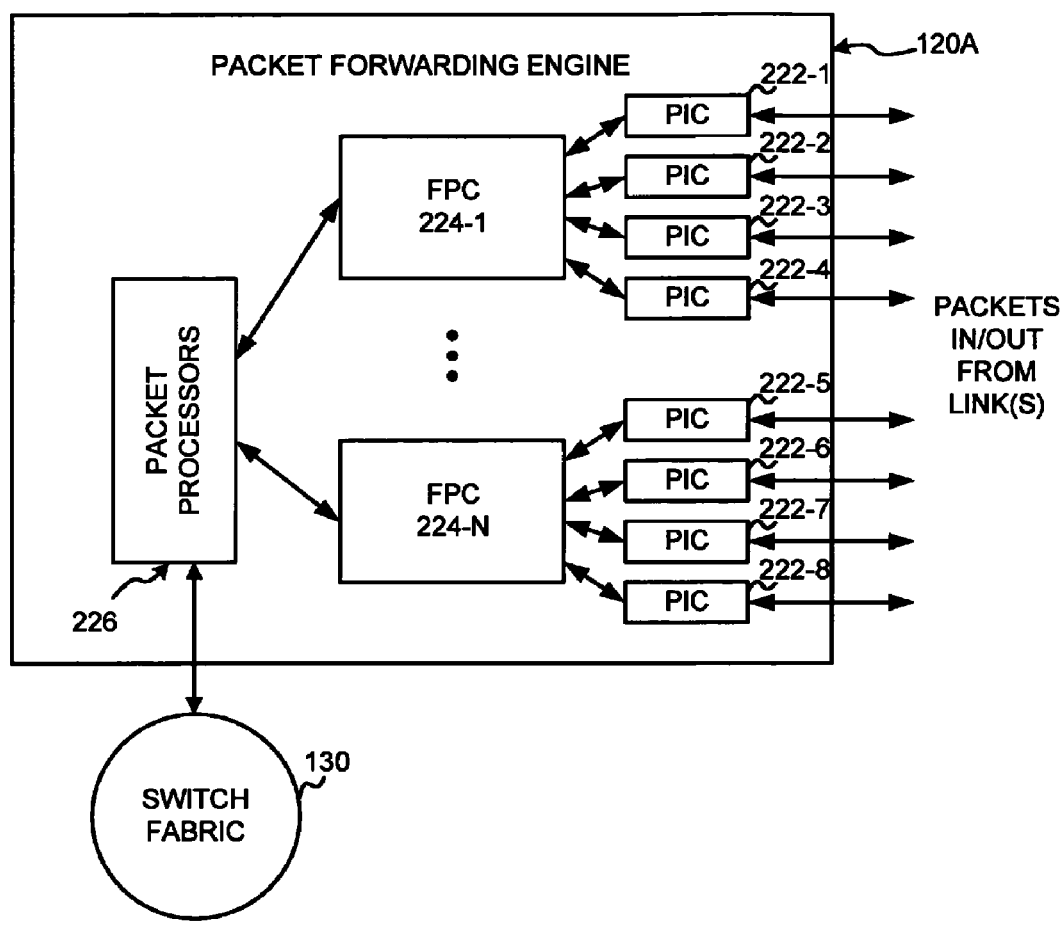
FIG. 2 is an exemplary diagram illustrating one of the packet forwarding engines shown in FIG. 1 in additional detail.

FIG. 2 is a diagram illustrating one of PFEs 120, such as PFE 120A, in additional detail. It will appreciated that PFEs 120B-120N may be similarly configured. PFE 120A may include programmable interface cards (PICs) 222, such as PICs 222-1 through 222-8, flexible PIC concentrators (FPCs) 224-1 through 224-N (referred to collectively as FPCs 224), and one or more packet processors 226. PICs 222 provide low-level interfaces to the physical links. PICs 222 receive and transmit packets from the physical links. PICs 222 may include media-specific logic that performs, for example, framing and checksum verification. Different types of PICs 222 may operate according to different transmission rates or physical media types, such as OC-192 and OC-48 transmission rates, and protocols or standards, such as the Synchronous Optical Networking (SONET) standard for data transmission over optical networks.

FPCs 224 may be cards that include input/output control logic that directs and manages the packets received and transmitted by PICs 222. FPCs 224 may, for example, count packets and bytes, apply class-of-service rules to packets, prioritize packets, and perform basic packet integrity checks. Packet processor(s) 226 may include logic that determines how to route the packets in the network. Packet processor(s) 226 may additionally transmit/receive packets with other PFEs 120 via switch fabric 130. Packet processor 226 may operate upon packet header information received from FPCs 224 to identify which of PICs 222, either on this PFE 120A or another one of PFEs 120, to output the packet. Packet processor 226 may use information received from routing engine 110 when processing the packets.

Each of PFEs 120 may be configured as a number of circuit boards in the router. As mentioned, the different PFEs 120 and routing engine 110 may communicate with one another via switch fabric 130. In one implementation, PFE 120A may include separate circuit boards for a packet processor 226 and FPCs 224 interconnected by a midplane. In other implementations, PFE 120A may include multiple packet processors 226 and FPCs 224 interconnected by the midplane.

Figure 3:
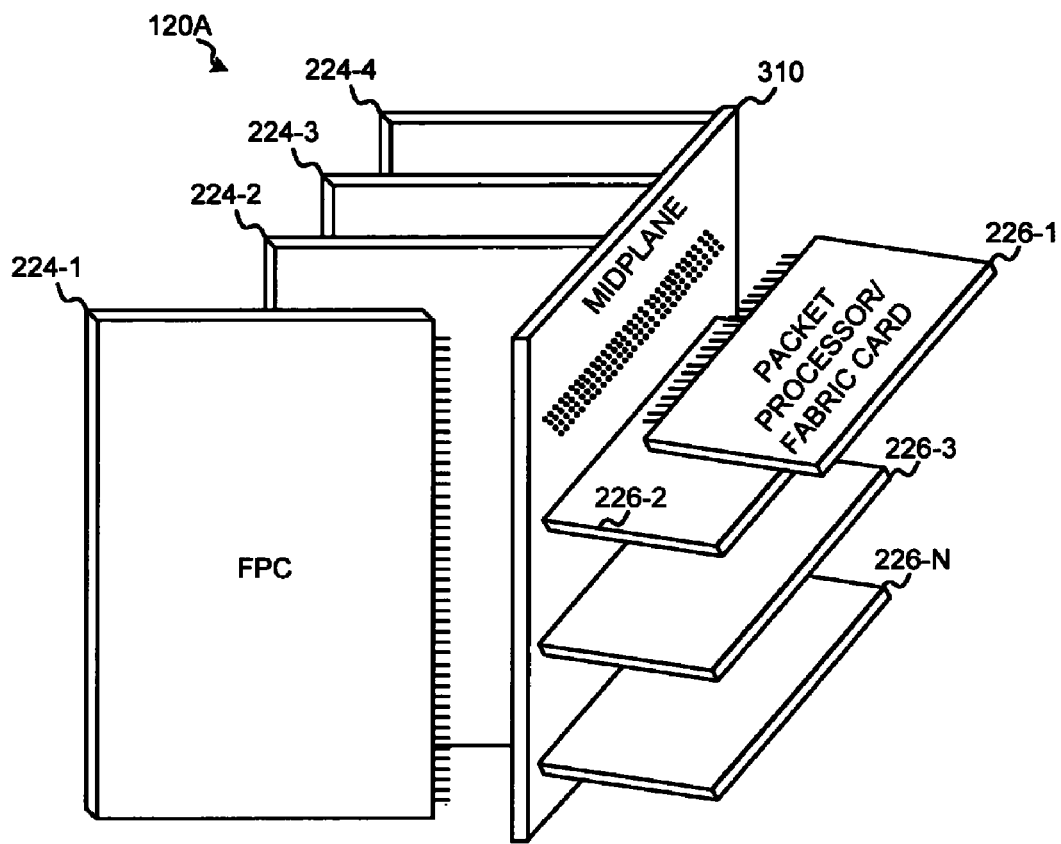
FIG. 3 is an exemplary perspective view illustrating a packet forwarding engine.

FIG. 3 is an exemplary perspective view illustrating a physical layout of one of PFEs 120, such as PFE 120A. PFEs 120A may include a number of FPCs 224 and packet processors 226 implemented as circuit boards. FPCs 224 may be inserted into a midplane 310 that connects FPCs 224 to packet processors 226. In one implementation, midplane 310 may include a circuit board that includes connections between packet processor cards 226 and FPCs 224.

Packet processors 226, in addition to performing packet processing functions, may also act as an interface for switch fabric 130. Packet processors 226 will thus alternatively be referred to herein as "fabric cards" 226. Although four FPCs 224 and four fabric cards 226 are shown in FIG. 3, more or fewer of either of these components may be used in various implementations. For simplicity, PICs 222 are not shown in FIG. 3. As previously mentioned, multiple PICs 222 may be connected to each of FPCs 224.

Different ones of FPCs 224 may be of different versions. For example, FPC 224-1 and 224-3 may be older FPC board while FPCs 224-2 and 224-4 may be newer FPC boards. In general, more recent FPCs will have increased bandwidth and/or processing capabilities. From the point of view of a vendor purchasing system 100, it would be desirable to be able to simultaneously use FPCs of different versions in the same PFE 120. Doing so allows the vendor to more easily upgrade system 100 by simply buying additional boards as needed to increase the capacity/capability of system 100.

One difference between different versions of FPCs 224 may be the bus used to connect FPCs 224 to fabric cards 226. For example, an older version of an FPC may use a source synchronous bus while a newer FPC version may use an asynchronous bus. The asynchronous bus may be used to support higher transfer rates between the FPC and the fabric cards. These potentially different bus standards can be said to present a multi-interface bus to the rest of system 100.

Figure 4:
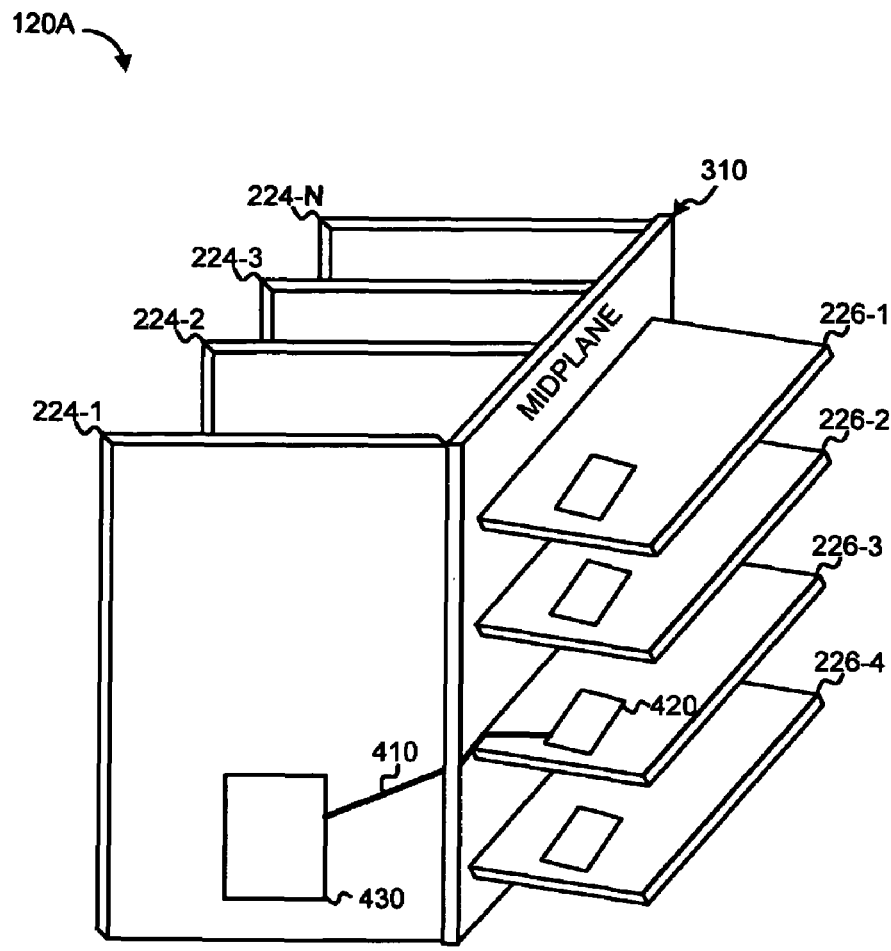
FIG. 4 is another exemplary perspective view illustrating the packet forwarding engine.

FIG. 4 is another perspective view illustrating a physical layout of PFE 120A, including an exemplary bus 410 that connects one of FPCs 224 and one of the fabric cards (e.g., fabric card 226-1 and FPC 224-3). Fabric card 226-1 and FPC 224-3 may each include logic for handling communications over bus 410, called fabric communication logic 420 and communication logic 430 located on the fabric cards and FPCs, respectively. Fabric communication logic 420 and communication logic 430 may be physically implemented in a number of different ways, such as application specific integrated circuits (ASICs), field programmable gate arrays (FPGAs), or the like.

Although only a single bus 410 is shown in FIG. 4 for simplicity, in general, midplane 310 may include connections for a number of buses between fabric cards 226 and FPCs 224. In one implementation, FPCs 224 may be removed from and inserted into midplane 310 as needed by the end-user. Upon bootup, each of the inserted fabric cards 226 and FPCs 224 may identify themselves and be assigned one or more other FPCs/fabric cards with which to communicate. For example, FPC 224-1 may be associated with fabric card 226-3. Accordingly, FPC 224-1 may communicate with fabric card 226-3 over bus 410. If FPC 224-3 was assigned to another fabric card, it may communicate with that fabric card using a similarly implemented bus that traverses midplane 310. Additionally, multiple buses 410 may connect a single one of fabric cards 226 and FPC s 224.

In one implementation, each bus 410 may include twelve physical connection lines that are used to transmit data either via a source synchronous connection or a clock-recovered asynchronous connection. More particularly, in this implementation, when the connected FPC 224 is designed to communicate using a source synchronous connection, bus 410 may be operated as a source synchronous bus. In this situation, the twelve bus lines may include eleven data lines and a clock line. When the connected FPC 224 is designed to communicate using an asynchronous connection, however, bus 410 may be operated without a clock line. As an exemplary configuration, the twelve lines of bus 410 may be operated at 933.12 mega-bits per second (Mbps) when implementing a source synchronous bus, for a total raw bandwidth of approximately 10.24 giga-bits per second (Gbps). When operating asynchronously, only eight of the twelve lines may be used, and may each be operated at 3.1104 Gbps, for a total raw bandwidth of approximately 24.88 Gbps. Fabric communication logic 420 on fabric cards 226 may automatically determine the type of communication bus it needs to implement based on the inserted FPC with which fabric cards 226 are associated.

Figure 5:
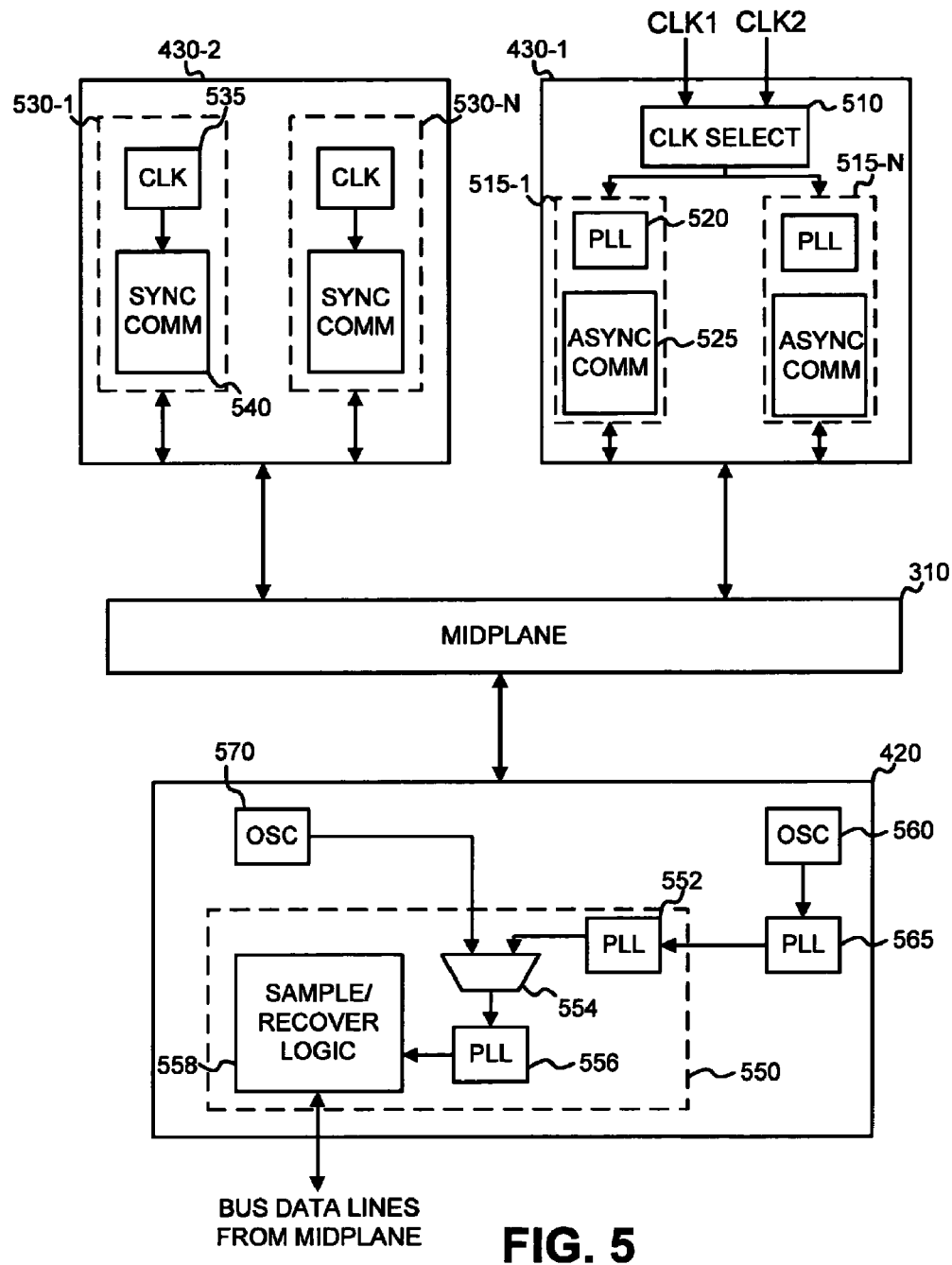
FIG. 5 is a block diagram illustrating exemplary logic for implementing a multi-interface bus.

FIG. 5 is a block diagram illustrating exemplary logic for implementing multi-interface bus 410. In this example, communication logic 430 on two different FPCs 224 are shown, asynchronous communication logic 430-1, which implements an asynchronous bus, and synchronous communication logic 430-2, which implements a source synchronous bus. Either one of the FPCs associated with logic 430-1 and 430-2 may communicate with fabric communication logic 420. For example, another process running in system 100, such as one running in RE 110, may assign FPCs 224 to fabric cards 226 at system initialization. In some cases, multiple FPCs 224 may be assigned to a single fabric card 226-1 to 226-N.

Asynchronous communication logic 430-1 may transmit data to fabric communication logic 420 via midplane 310 based on an externally generated clock signal. In one implementation, the externally generated clock signal may be a Stratum 3 SONET clock module (not shown) that generates a 19.44 MHz clock signal. For redundancy, two external clock modules may be used to generate first and second external clock signals with a relatively tight frequency tolerance (e.g., plus or minus 4.6 parts per million (ppm) frequency tolerance) between the first and second clock signals.

Asynchronous communication logic 430-1 may include a clock signal select component 510 and asynchronous networking elements 515-1 through 515-N. Each asynchronous networking element 515 may include a phase locked loop (PLL) 520 and an asynchronous communication component 525. PLL 520 may be a "good" PLL, e.g., one that exhibits relatively low phase noise and jitter. PLL 520 may additionally provide frequency multiplication of its input clock signal. For instance, the input 19.44 MHz clock signal may be multiplied by a factor of 16 to obtain a 311.04 MHz clock signal.

Asynchronous communication component 525 may include, for instance, logic designed to handle asynchronous communications over midplane 310. As previously mentioned, the asynchronous communications may be performed at 3.11 Gbps through eight data lines over midplane 310 to fabric communication logic 420.

Multiple networking elements 515 (i.e., network elements 515-1 through 515-N) may be implemented to communicate with fabric cards 226. Each networking element 515 may, for example, handle the communications from/with a single PIC or multiple PICs to one or more of fabric cards 226. Thus, packets may be received by a PIC plugged into the FPC, asynchronously transmitted by asynchronous communication logic 430-1 to a fabric card, and transmitted over switch fabric 130 to other PFEs. Similarly, packets may be received by asynchronous communication logic 430-1 from fabric communication logic 420, which may have itself received the packets from other PFEs or FPCs.

Synchronous communication logic 430-2, as with asynchronous communication logic 430-1, interfaces with fabric communication logic 420. Synchronous communication logic 430-2, however, may implement a source synchronous link over midplane 310.

Synchronous communication logic 430-2 may include synchronous networking elements 530-1 through 530-N. Each networking element 530 may include an oscillator (clock source) 535 and a synchronous communication component 540. Oscillator 535 may include, for instance, a 933 MHz surface acoustic wave (SAW) resonator. Synchronous communication component 540 may include, for instance, an ASIC or FPGA designed to handle source synchronous communications over midplane 310. As previously mentioned, the synchronous communications may be performed at 933 MHz through twelve lines (ten data and one clock line) over midplane 310 to fabric communication logic 420. As with asynchronous networking elements 515, multiple networking elements 530 may be used to communicate from/with a single PIC or multiple PICs to one or more of fabric cards 226.

Fabric communication logic 420 may include multi-interface bus logic 550, oscillator 560, PLL 565, and oscillator 570. When receiving data, multi-interface bus logic 550 may generally perform clock recovery and sampling based on an input clock source selected appropriately for the type of bus. More particularly, oscillator 560 and PLL 565 provide a clock source for the asynchronous bus interface and oscillator 570 provides a clock source for the synchronous bus interface. In one implementation, oscillator 560 may provide a 19.44 MHz clock signal and PLL 565 may be a PLL that provides a factor of 16 frequency multiplication, generating a 311.04 MHz signal to multi-interface bus logic 550. Oscillator 570 may provide a 466.56 MHz clock signal to multi-interface bus logic 550.

Multi-interface bus logic 550 may include a PLL 552, a multiplexer 554, a PLL 556, and sampling/recovery logic 558. PLL 552 may provide additional frequency multiplication for the clock signal from PLL 565. Multiplexer 554 selects whether the clock signal from PLL 552 or oscillator 570 will be used to recover the input data stream. PLL 556 may provide further clock multiplication (e.g., times four) to generate a final clock signal that is used to recover the data stream by sampling/recovery logic 558. Sampling/recovery logic 558 may generally function to provide clock recovery and sampling on the input data stream from midplane 310. As previously mentioned, in one implementation, the input data stream may be either an 8 bit-wide stream (asynchronous operation) or an 12 bit-wide stream (synchronous operation). The sampled data may then be further processed by the fabric card, transmitted to one of the FPCs, or transmitted over fabric switch 130 to another fabric card.

Clock recovery and sampling are known in the art. In general, sampling/recovery logic 558 regenerates the clock signal at a phase needed to sample the data stream based on the clock signal output from PLL 556 and based on transitions in the data signal. To ensure that the received data signal has enough transitions to avoid errors, communication logic 430 may scramble or encode the transmitted data signal.

Although the bus interface used by synchronous communication logic 430-2 is source synchronous and therefore contains an explicit clock signal, the clock signal may be ignored or treated as a data signal by sampling/recovery logic 558. In this manner, sampling/recovery logic 558 internally handles the data stream from both asynchronous communication logic 430-1 and synchronous communication logic 430-2 in a similar manner.

From the standpoint of fabric communication logic 420, the communication channel with either asynchronous communication logic 430-1 or synchronous communication logic 430-2 is physically identical—e.g., twelve physical traces per each communication channel. The communication scheme used by fabric communication logic 420 is based on the type of FPC plugged into midplane 310. For example, when an asynchronous FPC is inserted, only eight of the twelve physical traces may actually be used and the data is communicated in a clock-recovered asynchronous manner. When a synchronous FPC is inserted into midplane 310, eleven of the twelve physical traces may be used for data and one for the clock signal. As described above, when receiving data at the fabric card, the clock signal for synchronous operation may be ignored or regarded as a data signal. Fabric communication logic 420 may handle other differences between the two communication standards. For example, different logical signal levels and bit-to-bit skew differences may be taken into account.

Regarding the different logical signal levels, low voltage differential signaling (LVDS) may be used to implement the synchronous bus interface. In contrast, a second signaling standard, such as current mode logic (CML) may be used to implement the asynchronous bus interface. LVDS and CML may use different input/output signal levels. Based on the type of FPC with which it is connected, sampling/recovery logic 558 may detect the appropriate signal levels.

Regarding bit-to-bit skew, when fabric communication logic 420 transmits data back to synchronous communication logic 430-2, the data is transmitted synchronously using, for example, the eleven data lines and a clock line. In this situation, fabric communication logic 420 may thus regenerate a clock signal that is applied to the synchronous clock line. Fabric communication logic 420 may operate to maintain an acceptable difference in bit-to-bit skew across the twelve transmission lines.

Figure 6:
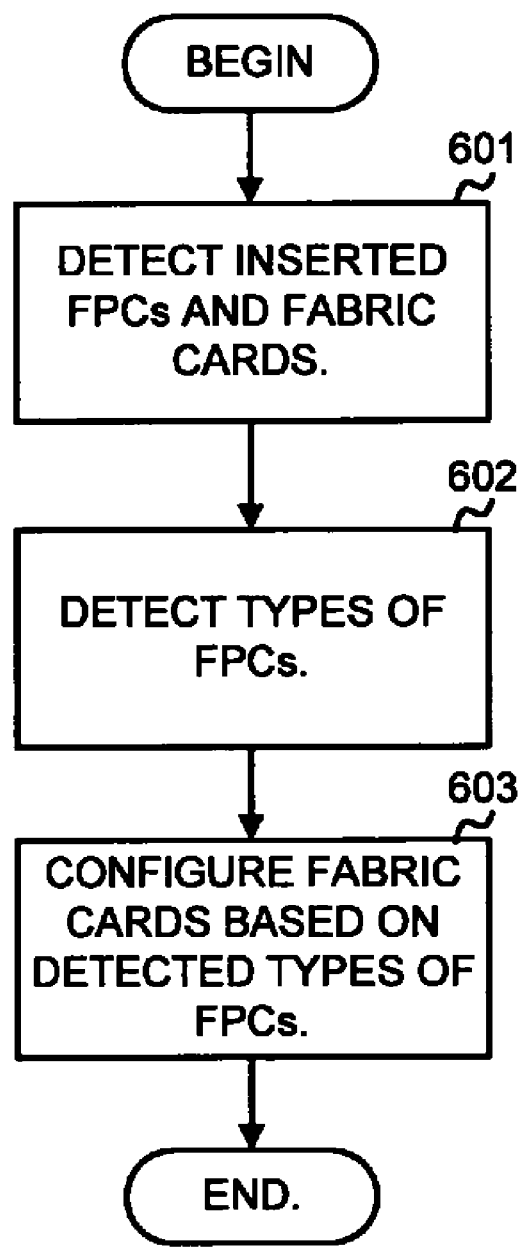
FIG. 6 is a flow chart illustrating exemplary operations performed in implementing a multi-interface bus.

FIG. 6 is a flow chart illustrating exemplary operations performed by system 100 in implementing the multi-interface bus. Upon initialization of one of PFEs 120, the system may detect the configuration of the devices in midplane 310. In other words, system 100 may detect which slots have an inserted FPC or fabric card (act 601). This detection may be made by, for instance, a monitor process (not shown) running on RE 110 or in another module or hardware card.

The monitor process may additionally detect the type of each of the inserted FPCs 224 (act 602). For example, users may insert some FPCs of a first type or version, such as FPCs built to communicate using a source synchronous bus operating at a first rate, and some FPCs of a second type or version, such as FPCs built to communicate asynchronously at a second rate. The type of each inserted FPC may be detected by the monitor process based, for example, on the initial communication patterns that the FPC asserts to the system. Fabric communication logic 420 on the various fabric cards may then be configured based on the type of detected FPCs (act 603). For example, multiplexer 554 may be controlled to receive the correct input clock source (e.g., clock input from PLL 552 or oscillator 570) and sample/recover logic 558 may be configured based on the type of FPC.

Figure 7:
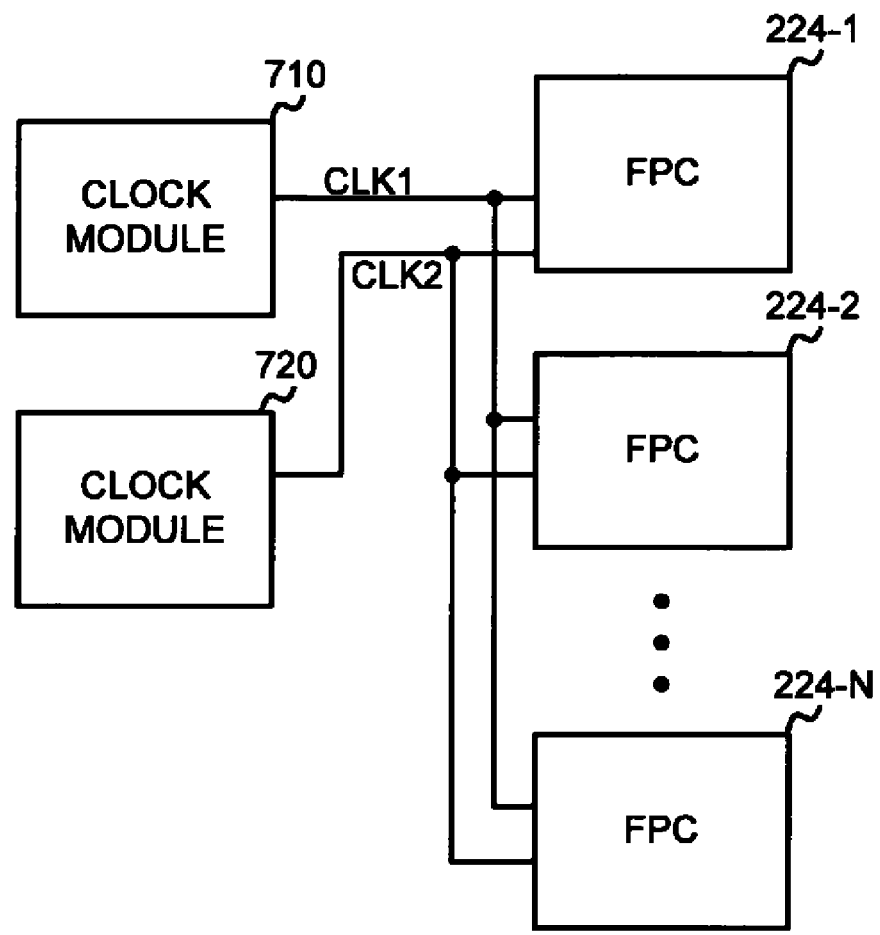
FIG. 7 is a diagram illustrating redundant clock signals.

FIG. 7 is a diagram illustrating the redundant nature of the clock signals leading into asynchronous communication logic 430-1 (CLK1 and CLK2 in FIG. 5). In one implementation, clock modules 710 and 720 may each be Stratum 3 clock modules that generate clock signals having a tight frequency tolerance, such as plus or minus 4.6 parts per million (ppm) relative to one another. The tight frequency tolerance is needed so that when changing between clock modules 710 and 720, the frequency shift is kept to a minimum. In one implementation, the redundant clock signals may be input to each of the FPCs 224 on a PFE 120. In another possible implementation, separate clock modules 710 and 720 may be provided for each FPC 224.

CONCLUSION

As described above, a multi-interface bus allows for different bus standards to be implemented over the same set of physical bus lines. The type of bus standard to implement may be based on the type of device plugged into one end of the bus.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although some of the operations described above were described in a particular order, many of the operations are amenable to being performed simultaneously or in different, orders to still achieve the same or equivalent results.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Certain portions of the invention have been described as "logic" that performs one or more functions. This logic may include hardware, such as an ASIC or a FPGA, software, or a combination of hardware and software.

No element, act, or instruction used in the present application should be construed is critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed is:

1. A system comprising:
    a first circuit board to:
        identify, when a second circuit board is inserted into a device connected to the first circuit board, whether the second circuit board, communicating with the first circuit board via a communication bus formed by a plurality of communication lines, is designed to communicate using a synchronous bus protocol or an asynchronous bus protocol by detecting an initial communication pattern;
        communicate with the second circuit board using the synchronous bus protocol when the second circuit board is designed to communicate using the synchronous bus protocol,
        when communicating using the synchronous bus protocol, the first circuit board being to:
            communicate with the second circuit board using all of the plurality of communication lines forming the bus, and configure a multiplexer of a multi-interface bus logic associated with the first circuit board to receive a clock signal from an oscillator; and communicate with the second circuit board using the asynchronous bus protocol when the second circuit board is designed to communicate using the asynchronous bus protocol, when communicating using the asynchronous bus protocol, the first circuit board being to:

communicate with the second circuit board using a subset of the plurality of communication lines forming the bus, and configure the multiplexer of the multi-interface bus logic associated with the first circuit board to receive a second, different clock signal from a phase locked loop.

2. The system of claim 1, where, when the second circuit board is designed to communicate using the asynchronous bus protocol, the second circuit board is to use redundant clock inputs when asynchronously transmitting data to the first circuit board.

3. The system of claim 2, where the redundant clock inputs have a relative frequency tolerance of approximately +/−4.6 parts per million or less.

4. The system of claim 1, where the system is a router.

5. The system of claim 4, where the second circuit board is to transmit and receive packets on a physical link from one or more insertable physical interface cards.

6. The system of claim 1, where the first circuit board is further to:

communicate with the second circuit board using a first rate when the second circuit board is designed to communicate asynchronously, and communicate with the second circuit board using a second rate when the second circuit board is designed to communicate synchronously, the first rate being faster than the second rate.

7. The system of claim 1, where the system further includes:

a midplane connecting the first circuit board and the second circuit board.

8. The system of claim 1, where the first circuit board is further to perform clock recovery in order to sample data.

9. A network device comprising:

a second card capable of communicating, asynchronously or synchronously, with a first card inserted into the network device through a bus formed by a plurality of communication lines, the second card to:

determine whether the first card is designed to communicate synchronously or asynchronously, communicate with the first card using synchronous communications when the first card is designed to communicate synchronously, when communicating synchronously, the second card being to:

use all of a set of logical communication lines, which are different than clock signal lines, of the plurality of communication lines forming the bus, and configure a multiplexer of a multi-interface bus logic associated with the first circuit board to receive a clock signal from an oscillator; and communicate with the first card using asynchronous communications when the first card is designed to communicate asynchronously, when communicating asynchronously, the second card being to:

use a subset of the set of logical communication lines, and configure the multiplexer of the multi-interface bus logic associated with the first circuit board to receive a second, different clock signal from a phase locked loop.

10. The network device of claim 9, where the first card is to transmit and receive packets on a physical link from one or more insertable physical interface cards and where the second card includes a packet processor.

11. The network device of claim 9, where the network device includes a router.

12. The network device of claim 9, where, when the second card is to communicate with the first card using asynchronous communications, the first card is to receive redundant clock inputs.

13. The network device of claim 9, where the second card is to interpret signal levels in a first manner when the second card is to communicate with the first card using synchronous communications and interpret signal levels in a second manner when the second card is to communicate with the first card using asynchronous communications, where the first manner is different than the second manner.

14. A method implemented in a network device, the method comprising:

detecting, by a first networking card, whether a second networking card, inserted into the network device and communicating with the first networking card via a communication bus formed by a plurality of communication lines, is a synchronous networking card or an asynchronous networking card;

communicating, by the first networking card, synchronously with the second networking card based on detecting that the second networking card is a synchronous networking card, communicating synchronously including:

communicating with the second networking card using all of the plurality of communication lines forming the bus, and configuring a multiplexer of a multi-interface bus logic associated with the first networking card to receive a clock signal from an oscillator; and communicating, by the first networking card, asynchronously with the second networking card based on detecting that the second networking card is an asynchronous networking card, communicating asynchronously including:

communicating with the second networking card using a subset of the plurality of communication lines forming the bus, and configuring the multiplexer of the multi-interface bus logic associated with the first networking card to receive a second, different clock signal from a phase locked loop.

15. The method of claim 14, where the first networking card performs packet processing functions for a router.

16. The method of claim 15, where the first networking card transmits and receives packets on a physical link from one or more insertable physical interface cards.

17. A network card for connection to an external bus, the network card comprising:

a multiplexer to select between a first clock signal and second, different clock signal based on a type of external circuit board attached to the external bus; and logic to:

determine whether the external circuit board is designed to communicate synchronously or asynchronously, receive, using all logical communication lines of a plurality of communication lines forming the external bus, data over the external bus by using the first clock signal to recover a first sampling clock signal from a data signal of the external bus when the external circuit board is designed to communicate synchronously; and receive, using a subset of the plurality of logical communication lines forming the external bus, data over the external bus by using the second clock signal to recover a second sampling clock signal from a data signal of the external bus when the external circuit board uses an asynchronous bus.

18. The network card of claim 17, further comprising:
a first oscillator to produce the first clock signal, and
a second oscillator to produce the second clock signal having a frequency different than the first clock signal.

19. The network card of claim 17, where the network card includes a packet processor in a router.

20. The network card of claim 17, where the logic receives the data using different bus signaling levels when the external circuit board is designed to communicate synchronously than when the external circuit board is designed to communicate asynchronously.

21. The network card of claim 17, where the data is transmitted over the external bus at different clock frequencies when the external circuit board is designed to communicate synchronously than when the external circuit board is designed to communicate asynchronously.

* * * * *